May 18, 1971     J. L. THOMAS     3,579,484
COMPOUNDING AIDS FOR THERMOSETTING ALLYLIC
RESIN MOLDING COMPOUNDS
Filed March 18, 1968

— GATE -1/16" DEEP × 1/16" LONG

CAVITY PLATE SPIRAL LEAD .396;
EVOLUTE OF .096; 5° ROTATION -
72 STEPS @ .0055/ STEP
TOTAL SPIRAL LENGTH 30 INCHES
FINISH - MIRROR POLISH

*INVENTOR.*
JAMES LARUE THOMAS
BY *Milton Zucker*
*Eugene ...*
*Charles ...*

United States Patent Office 3,579,484
Patented May 18, 1971

3,579,484
COMPOUNDING AIDS FOR THERMOSETTING
ALLYLIC RESIN MOLDING COMPOUNDS
James Larue Thomas, Baltimore, Md., assignor to
FMC Corporation, New York, N.Y.
Filed Mar. 18, 1968, Ser. No. 713,675
Int. Cl. C08f 3/60, 45/04
U.S. Cl. 260—78.4          8 Claims

ABSTRACT OF THE DISCLOSURE

The compounding characteristics of thermosetting allylic resin molding compounds are improved by the addition of 1 to 100 parts per million, by weight based on resin, of a metal, in chemically combined form, selected from the group consisting of magnesium, potassium, calcium, vanadium, chromium, manganese, iron, cobalt, nickel, copper, zinc, zirconium, molybdenum, antimony, tungsten, lead and cerium.

Addition of an effective amount of these selected metals causes a substantial improvement in compounding performance in terms of controllable uniform rate of viscosity increase during compounding and elimination of sticking to compoundng equipment without substantially altering the properties of the molding compound or the final molded product.

BACKGROUND OF THE INVENTION

Field of the invention

This invention relates to improving the compounding characteristics of thermosetting allylic resins by the addition of 1 to about 100 parts per million, by weight based on resin, of a selected metal in chemically combined form.

Description of the prior art

One of the major uses of allylic resins is in thermosetting molding compounds. Allylic molding compounds are widely used in molding structural and electrical parts by compression, transfer and injection molding techniques. An allylic resin is processed into a useful molding composition by subjecting the resin to compounding operations which involve uniform dispersion of fillers and/or reinforcing fibers, catalysts, mold lubricants, pigments and incidental additives such as retarders and coupling agents. The compounding operation must also adjust the bulk density of the molding compound to permit filling of mold cavities during one stroke of the compression mold force, transfer ram or screw.

The compounding process also imparts certain rheological or flow characteristics to the allylic molding compositions. Molded articles with desirable strength and electrical properties and which are free of voids and low density segments are made from molding compounds which have a narrow viscosity range in the fluid state in the heated mold just prior to the onset of curing. When the viscosity of the molding compound is too high there may not be enough available pressure in the molding machine to force the molding composition into all parts of the mold cavity. If the viscosity of the molding compound is too low at the molding temperature, sufficient pressure cannot be applied during early stages of the curing to permit forcing the molding compound into all portions of the mold cavity, particularly deep and narrow sections without causing excessive escape or "flashing" from the mold. That is, the molding composition spreads out of the mold cavity onto the face of the mold and through vent holes which are present in the mold to permit escape of entrapped air and gases, but not the molding compound.

The viscosity that the thermosetting molding compound exhibits in the fluid state just prior to the onset of curing is referred to as the melt viscosity. The compounding operation for a thermosetting molding composition should reproducibly provide thoroughly mixed and densified compounds with a narrow melt viscosity range. Frequently, the melt viscosity characteristics of a molding composition are adjusted to fit a specific molding operation.

Mixing, densification and control of flow of the molding compound are usually accomplished in equipment designed to provide intensive in-put of energy such as roll mills, screw extruders, Banbury mixers and the like. Allylic molding compositions are commonly compounded on a heated two-roll differential speed mill, that is a mill in which the two rolls rotate at different speeds. The two rolls, turning at different speeds, and with the slower roll set at a slightly lower temperature than the faster roll, provide intensive shearing action in the nip of the rolls. The temperatures of the rolls are adjusted to provide the shearing action necessary for the particular compounds, higher temperatures giving lower shearing stress.

One procedure for preparing an allylic molding compound is to feed a dry blend of resin, filler, fiber and other components into the nip of a heated two-roll mill. As the resin fuses, the light, non-homogeneous mass clings to both mill rolls. Under ideal conditions this mass soon transfers and clings entirely to the faster, warmer roll, where, as a result of the shearing action in the nip, the composition becomes a uniform band or sheet on this roll. If maximum fluidity, that is, low melt viscosity, is desired in the molding composition, the band is stripped from the roll immediately after reaching a uniform, leather-like sheet. The sheet is cooled and then ground to the desired particle size for marketing as a granular molding compound. When less than maximum fluidity is required in the molding composition, the band is allowed to remain on the mill longer until the composition acheves a higher melt viscosity, that is, lower fluidity.

The above procedure may be modified by dissolving the resin in a volatile solvent, such as acetone, methyl ethyl ketone and the like, and then mixing the rest of the ingredients into the resin solution. This mixing is conveniently done in a sigma blade, or other high-torque mixer in which all other ingredients, including fillers and fibers as well as peroxide catalysts are added to the resin solution. Solvent is then removed from the mixture by evaporation, usually in a forced-draft oven at a slightly elevated temperature. The drying temperature is chosen to effectively remove the solvent without activating the peroxide catalyst. The dried mass is then milled as in the solventless procedure.

The mixing may be performed by the dry, solventless process or by the solution technique, but both require good performance of the allylic resin in compound equipment. When using a two-roll, differential speed mill, good milling characteristics in both cases entail (1) adequate wetting of the mill rolls to permit shearing in the nip, (2) fast banding of the compound on the rolls coupled with quick transfer of the material to the faster, warmer roll, (3) increase in viscosity of the compound at an easily controllable and uniform rate to provide increasingly stiffer-flowing compounds, and (4) clean stripping of the compound from the roll mill at the completion of the milling operation. Failure of a molding compound to perform satisfactorily in any of these respects adds appreciably to the cost of using the composition and proportionally reduces commercial acceptability.

A skilled mill operator can compensate for poor performance in one or more of these characteristics by adjusting the milling conditions. Inadequate wetting of the rolls can be compensated for by increasing the roll temperature. Unfortunately, this reduces the shearing action of the mill due to the reduced viscosity of the compound, and also causes non-uniform increase in viscosity of the compound. Excessive stickiness on the rolls can be reduced by lowering the roll mill temperatures. Lowering the mill temperatures may result in excessive shearing action causing severe degradation of reinforcing fiber length and extremely long and costly milling to achieve the desired compound viscosity. Lengthy milling times are also undesirable because of possible destruction of peroxide curing agents and/or partial volatilization of the peroxide which results in incomplete cure or retarded cure rate of the finished molding compounds during subsequent molding operations.

The rate of increase of viscosity on the mill can be controlled somewhat by formulation. However, freedom of formulation is restricted by economic considerations and property requirements of the molder and the designer of the finished article and by specifications covering electrical and mechanical properties required in the finished molded parts. For example, high oil absorption fillers or higher concentrations of fillers yield compounds whose viscosity increases rapidly on the mill. However, excessive dilution of the resin with fillers, which usually have electrical properties inferior to the resin, will result in molded articles with unacceptable electrical properties.

Despite continuing effort to provide allylic resins having reproducible and controllable compounding behavior through modifications of production processes, allylic prepolymer products have continued to exhibit wider variations in compounding performance than is desirable. Resin samples produced under apparently identical conditions and which are otherwise identical by standard chemical and physical test methods have, during compounding, exhibited undesirably long times to achieve the flow desired in subsequent molding operations. That is, polymer lot to lot behavior during compounding has been unpredictable. In addition to variable rate of viscosity increase, some lots of resin have exhibited an unpredictable tendency to stick to compounding equipment.

SUMMARY OF THE INVENTION

I have now discovered that the addition of 1 to about 100 parts per million, by weight based on resin, of certain metals in chemically combined form to allylic molding compounds causes a substantial improvement in compounding performance in terms of uniformity of viscosity increase and elimination of resin sticking to compounding equipment without substantially affecting the storage stability or cure behavior of the resulting compound. The metals I have found effective are: magnesium, potassium, calcium, vanadium, chromium, manganese, iron, cobalt, nickel, copper, zinc, zirconium, molybdenum, antimony, tungsten, lead and cerium.

The addition of some of the above metals to other peroxide-cured resin systems, particularly polyesters, is well known in the art. However, in these instances the effect of the metal addition is to accelerate the cure of the resin. Generally, appreciably higher levels of metal additives are used in this art and the additives are used in combination with peroxides, particularly the ketone peroxides which are susceptible to activation by the metals. Cure acceleration, which may cause premature gellation on storage or during molding, is undesirable in allylic molding compounds, and is not brought about by the practice of this invention. Furthermore, the peroxide catalysts used in the curing of allylic molding compounds are known to be relatively insensitive to activation by the above-described metals. The relative insensitivity of peroxide catalysts such as tertiary butyl perbenzoate, dicumyl peroxide, di-tertiary butyl peroxide and tertiary butyl hydroperoxide to activation by these metals is known in the art. It is therefore surprising that these metal additives at levels of only 1 to 100 parts per million improve the compounding characteristics of allylic molding compounds and yet have no substantial effect on curing behavior.

DESCRIPTION OF THE INVENTION AND THE PREFERRED EMBODIMENTS

Figure 2:
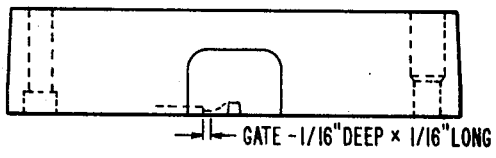
FIGS. 1, 2 and 3 are drawings of the spiral flow test mold cavity (cavity plate spiral lead 396; evolute of .096; 5° rotation=72 steps @ .0055/step; total spiral length 30 inches; finish-mirror polish; tolerances—decimals .001, fractions .010, angles 30') used in evaluating the molding compounds of this invention.

I have found certain metals, in chemically combined form, to be effective in improving the compounding characteristics of allylic resin molding compounds. The effective metals include magnesium, potassium, calcium, vanadium, chromium, manganese, iron, cobalt, nickel, copper, zinc, zirconium, molybdenum, antimony, tungsten, lead and cerium. I have evaluated magnesium acetylacetonate, potassium octoate, calcium octoate, vanadium acetylacetonate, chromic oxide, chromium acetylacetonate, manganese naphthenate, iron octoate, iron naphthenate, cobalt octoate, cobalt naphthenate, cobaltous sulfate, nickel acetylacetonate, copper naphthenate, zinc naphthenate, zirconium octoate, molybdenum (III) acetylacetonate, tributyl antimony, tungsten hexacarbonyl, lead naphthenate, lead octoate, and cerium naphthenate. All of these chemically combined metals are effective when added to allylic resin compounds at metal levels of less than about 100 parts per million of resin. These metals may be used alone or in combination with each other. The metals are added in a chemically combined form which can be dissolved or molecularly dispersed in the resin phase.

The level at which a particular metal or combination of metals is effective varies within the range of 1 to about 100 parts per million depending on the metal or metals. For example, cobalt is effective at 1 to 15 parts per million. Cerium, copper and manganese are effective at 2 to 25 parts per million. Other metals of the invention are effective at 10 to 100 parts per million. Several factors will influence the precise level of metal or combination of metals to be used in a particular case. Such factors include the identity of the allylic resin the nature and amount of filler and/or reinforcing fiber and the presence of other additives. The preferred amount of metal to be used in a given instance is readily determined by routine experimentation.

The metals can be incorporated into the molding compounds in any convenient manner. For example, the metals can be added at the time of compounding the allylic prepolymers into molding compounds or mixed with the solid allylic prepolymers before final compounding. The metals can also be incorporated by introducing liquid solutions of the metals into the prepolymer during recovery of the prepolymer from the allylic polymerization mixture, or by adding these metals to the polymerization mixture prior to recovery of the prepolymer from the allylic polymerization mixture.

Diallyl phthalate prepolymers to which this invention applies, that is, the diallyl esters of ortho, iso, and terephthalic acids, may be manufactured by polymerizing the monomeric material to produce a solution of the soluble prepolymer in monomer. Polymerization is carried to a point short of gelation which occurs when the molecular weight of the polymer reaches a point where it becomes insoluble in the monomer. The prepolymer must then be separated from the unpolymerized monomer. This may be done by treatment with a solvent which dissolves the monomer while precipitating the prepolymer. A conventional method of separating prepolymers from monomer is described by Willard in U.S. Pat. No. 3,030,341, issued Apr. 17, 1962. These prepolymers are solids containing little or no monomer; they can be stored indefinitely in this form, since they require catalysts and either heat or actinic light to convert them to the insoluble stage. Prepolymers produced by the process disclosed in U.S. Pat. 3,385,836, issued May 28, 1968, are amenable to treatment by the process of this invention.

Generally catalysts are used at levels of 1 to 5% by weight based on the weight of the polymerizable allylic materials present in the molding compound. Catalysts known in the art to be useful in curing allylic molding compounds may be used provided the catalysts are not substantially activated by metals disclosed in this invention. Useful peroxide catalysts include diacyl peroxides, such as benzoyl peroxide, p-chlorobenzoyl peroxide, 2,4-dichlorobenzoyl peroxide, lauroyl peroxide and succinic acid peroxide; dialkyl peroxides such as dicumyl peroxide and di-tert-butyl peroxide; hydroperoxides such as tert.-butyl hydroperoxide, and 2,5-dimethylhexane-2,5-dihydroperoxide; peroxy esters such as tert.-butylperbenzoate, 2,5-dimethylhexane-2,5-di(peroxybenzoate), tert.-butyl peracetate, tert.-butyl peroxyisobutyrate and many other organic peroxides described in the literature and known to be useful for curing allylic resins and which are not promoted by the metals disclosed in this invention.

A wide variety of water-insoluble, inert fillers may be used in preparing molding compounds to which this invention may be applied. Useful fillers include calcium carbonate, both precipitated and wet-ground types, calcium silicate (Wollastonite), silica, hydrated clays, calcined clays, chalk, calcium sulfate (anhydrous), barium sulfate, asbestos, glass (powdered), quartz, aluminum trihydrate, aluminum oxide, antimony oxide, magnesium oxide, inert iron oxides and ground stone such as granite, basalt, marble, limestone, sandstone, phosphate rock, travertine, onyx and bauxite.

Diallyl phthalate molding compounds are generally reinforced with fibrous materials to improve mechanical or physical properties of the molded compound. All the inert fibrous materials conventionally used in diallylic phthalate molding compounds can be used including cellulosic materials, synthetic fibers such as rayon, nylon cellulose acetate and polyester fibers, as well as glass fibers.

Glass-filled allylic compounds are among the most common varieties of allylic molding compounds in current use. The predominant type of filler in these compounds is glass filament, frequently of an average length less than one millimeter. These glass-filled molding compounds can be prepared on a differential speed two-roll mill by either the wet or dry compounding procedure. Randomly oriented individual fibers of the desired average length are attained during the compounding process from chopped glass strands which are available commercially. Commercial chopped strands are available in lengths varying from about one-eighth to about one inch in length. Strands less than about one-eighth inch in length are extremely difficult to produce on conventional glass cutting equipment. Strands of average length greater than about one-half inch yield bulky compounds in the unmilled condition which are very difficult to process. Generally strands of about one-quarter inch in length are preferred.

Experience with short glass fiber-filled allylic molding compounds on a differential speed two-roll mill with 6″ x 12″ rolls (6 inches in diameter by 12 inches in length) has established that milling times varying from about 90 seconds to produce very soft flow compounds to about 4 minutes for stiff flow compounds represent optimum milling performance. After 90 seconds milling, the glass strands have been broken into individual fibers and the fibers reduced in length to about 1 millimeter. Generally, a 90-second milling cycle produces a compound with flow characteristics such that, when transfer molded into a typical 30-inch spiral test mold, the compound should nearly fill the cavity before curing. A compound milled for 4 minutes should still be moldable, but on transfer molding only the first few inches of the spiral mold cavity are filled, even at maximum transfer pressure, before the compound enters the cured state. Although the four minute milling may reduce the fiber length to somewhat less than a millimeter, the fiber length is still adequate to reinforce the molding compound. More than four minutes milling generally results in fiber degradation that is so severe that the resultant molded pieces exhibit poor mechanical properties.

The following examples, illustrating the novel methods and compounds disclosed herein, are given without any intention that the invention be limited thereto. All parts and percentages are by weight.

EXAMPLE 1

A series of metals was evaluated for their influence on milling behavior of short glass fiber-filled molding compounds prepared using the following standard mixture.

Ingredients: Parts by weight
    Diallyl o-phthalate prepolymer _____ 800
    Tert.-butyl perbenzoate _____ 24
    Calcium stearate _____ 16
    Vinyl-tris(2-methoxyethoxy) silane _____ 8
    ¼ inch glass strands _____ 800
    Acetone _____ 800
    Metal (added in chemically combined form) __ ([1])

[1] Parts per million of metal based on prepolymer as indicated in Table 1.

Diallyl phthalate polymers of varying melt viscosity were used in the examples of Table 1. Melt viscosity was determined on a Brabender Plasticorder, Model PLV3AA, with a Type 6 roller mixer measuring head whose temperature was maintained at 121° C. The test procedure employed measures the flow and cure rate of thermosetting resins under dynamic test conditions. The flow of a sample under test is continuously observed as the torque (in meter-grams) required to flux the resin in the mixer measuring head at selected conditions of temperature and shear rate (r.p.m.) through the minimum viscosity and thereafter until the gelled state is reached. The results of the test are recorded on a chart which relates torque versus time throughout the test.

The plasticorder measuring head was adjusted to a temperature of 121° C.±0.5° C. during a preheating period of about one hour. The recorder was set at a strip chart speed of 10 mm./minute, and the instrument sensitivity set to 1:5. The shear rate of the mixer was adjusted to 33 r.p.m., the dynamometer and the recorder were adjusted to zero. With the range selector on X1, the damper setting was adjusted to provide a recovery time of 6±1 seconds. Fifty-two grams ±0.1 gram of prepolymer was added to the mixer while the instrument was running. Maximum test reproducibility was obtained when the loading rate was steady and slow enough so as to avoid overloading the shear coupling. A loading time of 20 seconds was found satisfactory. The torque increases as the mixing of the resin is initiated and usually passes through an initial loading peak and then reaches a steady state of minimum flow viscosity. This is followed by a gelling stage which is indicated as an increase in torque value. The torque continues to increase as the sample gels until the sample is no longer able to deform and recover with the movement of the rotors. The sample is then reduced to a powdery form by the action of the rotors and the torque value passes through a maximum. The time to arrive at this peak from a point of minimum torque is recorded. The steady state of minimum viscosity which occurs after the initial loading peak and before the gelling stage is recorded as the melt viscosity and appears in the following table under the column headed BMV (Brabender melt viscosity). The melt viscosity values for the various prepolymer lots used are shown in Table 1.

In the preparation of the molding compounds of Table 1, all the ingredients except the glass were first dissolved in the acetone solvent. The glass was then mixed into the solution using a sigma-blade mixed and mixing was continued until the glass was well wetted. The mixture was removed from the mixer and spread on trays to air dry for at least 16 hours. The dry mass was transferred to a differential speed, two-roll mill for compounding.

The differential speed, two-roll mill had chromium-plated 12-inch wide by 6-inch diameter rolls, which were set at a gap of .050 inch (50 mils). The fast roll turned at 26 r.p.m., and the slow roll turned at 20 r.p.m. The temperatures of the slow and the fast rolls, respectively, along with milling performances of the mixtures are listed in Table 1.

Four hundred gram samples of the mixtures were milled. The procedure used was to pass the dry mixture through the mill one time to compact it. The compacted mixture was then placed on the mill and the milling time was measured from the time the mixture banded on the mill. At one-minute intervals during the milling 35 gram samples were cut from the band and set aside for the spiral flow molding test.

Figure 1:
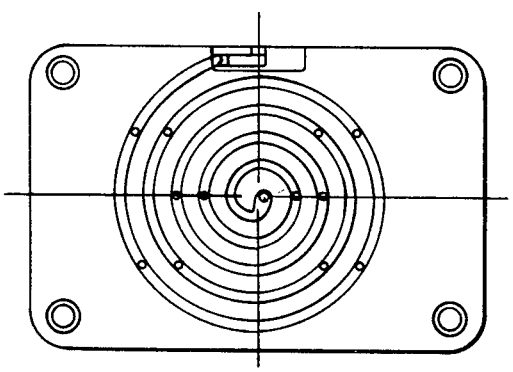
Figure 3:
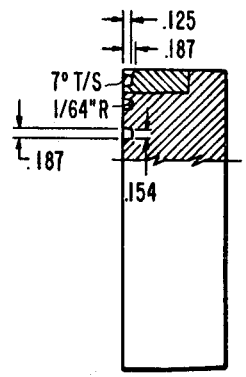

The flow of the molding compound was determined in a transfer molding press capable of delivering up to 24 tons force applied to a 2-inch diameter transfer ram. The molding cavity used for these determinations consisted of the 30-inch spiral test mold shown in FIG. 1. The spiral flow test results for each compound, expressed in inches of flow, for the indicated number of minutes on the mill, are contained in Table 1. All the compounds in Table 1 were molded into test specimen at 155° C. and 2000 p.s.i. and were found to achieve a minimum cure in less than 3 minutes.

TABLE 1.—DIALLYL O-PHTHALATE PREPOLYMERS WITH METAL COMPOUNDING AIDS

| Sample No. | Diallyl Phthalate prepolymer | | Metal compounding aid | | | Roll temp., ° F. | | Roll mill gel time, min.[2] | Milling characteristic | Spiral flow in inches after time on the mill of — | | | | |
|---|---|---|---|---|---|---|---|---|---|---|---|---|---|---|
| | Lot | BMV | Metal[1] | Type | Level as metal, p.p.m. | Slow roll | Fast roll | | | 1 min. | 2 min. | 3 min. | 4 min. | 5 min. |
| CS[3] | 173 | 540 | | | | 180 | 200 | 9′ | Wet | >30 | >30 | <30 | >30 | >30 |
| 1 | 173 | 540 | Co | Naphthenate | 5 | 140 | 160 | 4′10″ | Dry | 26 | 14 | 7 | 4 | |
| 2 | 173 | 540 | Co | do | 10 | 140 | 160 | 3′10″ | Dry | 18 | 9 | 2 | 0 | |
| 3 | 173 | 540 | Cu | do | 27 | 145 | 160 | 4′9″ | Dry | 27 | 25 | 16 | 8 | |
| 4 | 173 | 540 | Cu | do | 54 | 140 | 160 | 2′5″ | Dry | 15 | 5 | | | |
| 5 | 173 | 540 | Fe | do | 23 | 140 | 160 | 5′23″ | Dry | 30 | | 27 | 18 | |
| 6 | 173 | 540 | Fe | do | 56 | 140 | 160 | 3′53″ | Dry | 24 | | 12 | | |
| 7 | 173 | 540 | Mn | do | 11 | 140 | 160 | 5′35″ | Sl. wet | >30 | >30 | >30 | 29 | 28 |
| 8 | 173 | 540 | Mn | do | 22 | 140 | 160 | 3′58″ | Dry | >30 | >30 | 13 | | |
| 9 | 173 | 540 | V | Acetyl acetonate | 20 | 180 | 200 | 3′6″ | Dry | 27 | 21 | 3 | | |
| 10 | 173 | 540 | Sb | Tributyl | 100 | 180 | 200 | 4′50″ | Sl. wet | 18 | 13 | 7 | 4 | |
| CS[3] | 306 | 850 | | | | 180 | 200 | 5′10″ | Wet | >30 | >30 | 28 | | |
| 11 | 306 | 850 | Co | Octoate | 2 | 180 | 200 | 3′44″ | Dry | 26 | 19 | 7 | | |
| 12 | 306 | 850 | Co | do | 5 | 180 | 200 | 2′56″ | Dry | 22 | 12 | 6 | | |
| 13 | 306 | 850 | Co | do | 11 | 180 | 200 | 2′15″ | Dry | 8 | 4 | | | |
| CS[3] | 1663 | 900 | | | | 180 | 200 | 3′2′ | Dry | 21 | 14 | 2 | | |
| 14 | 1663 | 900 | W | Acetyl acetonate | 20 | 180 | 200 | 2′38″ | Dry | 15 | 13 | | | |
| 15 | 1663 | 900 | Ca | Octoate | 20 | 180 | 200 | 2′41″ | Dry | 16 | 9 | | | |
| 16 | 1663 | 900 | Ni | Acetyl acetonate | 20 | 180 | 200 | 2′5″ | Dry | 14 | 3 | | | |
| 17 | 1663 | 900 | K | Octoate | 20 | 180 | 200 | 2′22″ | Dry | 14 | 4 | 0 | | |
| 18 | 1663 | 900 | Zr | do | 23 | 180 | 200 | 1′58″ | Dry | 12 | 0 | | | |
| 19 | 1663 | 900 | Pb | Naphthenate | 38 | 180 | 200 | 2′16″ | Dry | 10 | 3 | | | |
| 20 | 1663 | 900 | Mo | Acetyl acetonate | 50 | 180 | 200 | 2′28″ | Dry | 15 | 5 | | | |
| 21 | 1663 | 900 | Ce | Naphthenate | 20 | 180 | 200 | 2′8″ | Dry | 3 | 0 | | | |
| 22 | 1663 | 900 | Zn | do | 20 | 180 | 200 | 2′28″ | Dry | 13 | 6 | | | |
| CS[3] | 5 | 540 | | | | 180 | 200 | 9′ | Wet | >30 | >30 | >30 | >30 | >30 |
| 23 | 5 | 540 | Cr | Naphthenate | 20 | 180 | 200 | 7′49″ | Dry | >30 | >30 | 24 | | |
| 24 | 5 | 540 | Cr | do | 100 | 180 | 200 | 7′4″ | Dry | 27 | 21 | | 11 | |
| 25 | 5 | 540 | Mg | Acetyl acetonate | 20 | 180 | 200 | 4′56″ | Dry | >30 | 26 | 21 | | |
| 26 | 5 | 540 | Cr[4] | Oxide | 50 | 180 | 200 | 4′46″ | Dry | >30 | >30 | | 14 | |
| CS[3] | 139 | 630 | | | | 180 | 200 | 6′42″ | Wet | >30 | >30 | | 22 | 12 |
| 27 | 139 | 630 | Cr | Acetyl acet. | 75 | 180 | 200 | 4′48″ | Dry | 29 | 25 | 11 | | |
| 28 | 139 | 630 | Mg | do | 50 | 180 | 200 | 4′15″ | Dry | 21 | 10 | 3 | 2 | |
| 29 | 139 | 630 | Co | octoate | 10 | 180 | 200 | 3′23″ | Dry | 22 | 12 | 4 | | |
| 30 | 139 | 630 | Ni | Acetyl acetonate | 50 | 180 | 200 | 2′50″ | Dry | 22 | 10 | | | |
| 31 | 139 | 630 | W | Hexacarbonyl | 75 | 180 | 200 | 3′8″ | Dry | 14 | 12 | 2 | | |

[1] Co, cobalt; Cu, copper; Fe, iron; Mn, manganese; V, Vanadium; Sb, antimony; W, tungsten; Ca, calcium; Ni, nickel; K, potassium; Zr, zirconium; Pb, lead; Mo, molybdenum; Ce, cerium; Zn, zinc; Cr, chromium; Mg, magnesium.
[2] Time required for gelation on the mill.
[3] Comparison sample.
[4] Chromic oxide.

The roll mill gell time is the amount of time required to gel the mixture on the mill. When the mixture gels it loses its plastic consistency and will not flow or transfer mold satisfactorily even under extreme-pressure molding conditions. The gel stage shows up during milling as white streaks in the sheet being milled, and the sheet begins to crumble on the mill. As the loss of plasticity increases, the power requirement to the mill increases.

The spiral flow test results show the milling time in minutes required to obtain a compound with desirable melt viscosity or flow characteristics. Commercial practice has established that diallyl phthalate molding compounds, sold as transfer molding grade compounds, have flows of 10 to 16 inches in the spiral flow test mold of FIG. 1. The transfer molding grade materials are used in molding intricate connectors containing metal inserts. Occasionally longer spiral flows of 18 to 24 inches are used in encapsulation molding and stiff materials for use in single cavity molds with flows as low as 3 inches have been made. A major commercial use of diallyl phthalate prepolymers is in transfer grade molding compounds which have flows of 12 to 15 inches.

Milling time should be less than about 4 minutes when the rolls are at least 140° F. and the gap between the rolls is 50 mils. Longer milling volatilizes the peroxide catalysts and degrades the reinforcing fibers so that the compounds do not mold properly, and the molded pieces have poor mechanical properties.

monomer, called "dope" characterized by a refractive index of 1.5330 (25° C.) and a bulk viscosity of 690 centistokes. A portion of this "dope" was distilled at 235° C. and 1.2 millimeters pressure by the process described in U.S. Pat. 3,385,836, issued May 28, 1968 to separate prepolymer from unreacted monomer. This prepolymer was labeled Prepolymer A.

Cobalt octoate, equivalent to 3.4 parts per million cobalt metal based on the prepolymer, was added to a portion of the "dope" described above prior to distillation under conditions as described above. The prepolymer containing about 3.4 parts per million by weight of cobalt was separated from the unreacted monomer and labeled, Prepolymer B.

Prepolymers A and B were compounded into the following mixtures.

| | Parts by weight | |
|---|---|---|
| Prepolymers | A | B |
| Ingredient: | | |
| Diallyl phthalate | 800 | 800 |
| Tert-butyl perbenzoate | 24 | 24 |
| Calcium stearate | 16 | 16 |
| Vinyl-tris(2-methoxyethoxy) silane | 8 | 8 |
| ¼ inch glass strands | 800 | 800 |
| Acetone | 800 | 800 |

The compounding and testing of these samples was done as described in Example 1. The results obtained were as follows.

| Prepolymer | BMV | Comp. aid Type | Comp. aid p.p.m. as Metal | Roll temp. °F. | Mill time, min. | Characteristics | Spiral flow in inches after time on the mill of— | | | | |
|---|---|---|---|---|---|---|---|---|---|---|---|
| | | | | | | | 1 min. | 2 min. | 3 min. | 4 min. | 5 min. |
| A | 850 | None | 0 | 180–200 | 5′10″ | Dry | 30 | 30 | 28 | | 7 |
| B | 810 | Cooctate | 3.4 | 180–200 | 3′29″ | Dry | 27 | 24 | 13 | | |

Samples 1–13 and 23–31 compounded from resin lots that required unduly long compounding cycles on the mill show improved compounding characteristics and flow properties obtained by using compounding aids of the invention. Samples 14–22, made from a resin lot that inherently imparts a short, acceptable, compounding cycle to a compounding mixture show the effectiveness of some additional compounding aids and that the compounding aids can be used to control the compounding characteristics and flow properties of a resin which compounds reasonably without compounding aids.

EXAMPLE 2

Example 1 was repeated in part except that diallyl isophthalate prepolymer was substituted for the diallyl orthophthalate prepolymer of Example 1. The standard mixture, premixing, compounding on a differential speed two-roll mill and flow testing described in Example 1 were used. The slow roll mill was set at 160° F. and the fast roll mill was set at 180° F. The diallyl isophthalate prepolymer had a melt viscosity, BMV, of 1000. The compounding aid used was cobalt octoate. The compounding aid level as metal, milling time, milling characteristics and spiral flow results of the compounds are found in Table 2.

TABLE 2.—DIALLYL ISOPHTHALATE PREPOLYMER COMPOUNDED WITH COBALT OCTOATE

| Prepolymer lot | Compounding aid level as metal, p.p.m. | Compounding Mill time, minutes | Characteristics | Spiral flow in inches after time on the mill of— | | | | |
|---|---|---|---|---|---|---|---|---|
| | | | | 1 min. | 2 min. | 3 min. | 4 min. | 5 min. |
| UM-3 | None | 5′27″ | Wet | 21 | 16 | | | 12 |
| UM-3 | 10 | 2′30″ | Dry | 11 | 4 | | | |

EXAMPLE 3

Diallyl o-phthalate monomer polymerized at 200° C. by a continuous initiation technique described in U.S. Pat. 3,385,836, issued May 28, 1968, filed Sept. 8, 1965, provided a polymerization mixture of prepolymer in

EXAMPLE 4

A diallyl orthophthalate prepolymer was prepared according to the procedure of Example 3. The prepolymer had a Brabender melt viscosity (BMV) of 650. The prepolymer was compounded into the short glass fiber-filled molding compounds in the following table. These samples were premixed, compounded and tested as described in Example 1. The molding compounds were molded at 155° C. and 2,000 p.s.i. for various periods of time. Minimum cure time, reported in minutes was determined. Minimum cure time was determined by immersing the molded samples in boiling chloroform for a period of three hours. Samples that were unattacked by this test were considered to be cured.

TABLE 3

| Samples | 4-1 | 4-2 | 4-3 | 4-4 |
|---|---|---|---|---|
| Diallyl o-phthalate prepolymer, p.b.w. | 800 | 800 | 800 | 800 |
| Calcium stearate, p.b.w. | 16 | 16 | 16 | 16 |
| Vinyl-tris(2-methoxyethoxy) silane, p.b.w. | 8 | 8 | 8 | 8 |
| ¼ inch glass strands, p.b.w. | 800 | 800 | 800 | 800 |
| Acetone, p.b.w. | 800 | 800 | 800 | 800 |
| Tertiary-butyl perbenzoate, p.b.w. | 0 | 0 | 24 | 24 |
| Cobalt metal p.p.m. (based on prepolymer) | 0 | 5 | 0 | 5 |
| Roll mill gel time, minutes | >20 | 12 | 11 | 3 |
| Spiral flow: | | | | |
| Minutes on mill | 20 | 11 | 10 | 2.5 |
| Flow in inches | >30 | >30 | 18 | 15 |
| Minimum cure time: Minutes at 155° C. at 2,000 p.s.i. | >20 | >20 | 2.0 | 1.8 |

The resin used in this example cannot conveniently be compounded into a satisfactory molding compound without using the compounding aids of this invention (see samples 4–1, 4–2 and 4–3). The addition of the compounding aid, cobalt octoate, or catalyst alone does not result in milling times of 4 minutes or less. The use of catalyst alone (sample 4-3) results in reasonable flow in the spiral test mold and a useful cure time, though the molded parts had poor mechanical properties as the milling time was too long. The example containing both cobalt octoate and catalyst had a short milling time, good spiral flow, a short cure time, and the molded piece had good mechanical properties.

Obviously, these examples can be multiplied indefinitely by varying the amounts of metals, or mixing the metals, used to improve the compounding characteristics of diallyl phthalate prepolymer molding compounds or by using various fillers, fibers, mold release agents, pigments and the like without departing from the spirit of the invention or the scope of the following claims.

What is claimed is:

1. In the process of preparing thermosetting allylic resin molding compounds, with adjusted bulk density and flow characteristics, by compounding a mixture of thermosetting allylic prepolymer, conventional fillers, reinforcing fibers and mold lubricants, the improvement in which improved compounding characteristics are obtained which comprises adding to the mixture, by weight based on prepolymer, a metal or mixture of metals, in chemically combined form, in an effective amount of less than 100 parts per million, selected from the group consisting of magnesium, potassium, calcium, vanadium, chromium, manganese, iron, cobalt, nickel, copper, zinc, zirconium, molybdenum, antimony, tungsten, lead and cerium, and an effective amount of a catalyst which is not substantially promoted by the metal; the metal being added in the amount of (a) 1 to 15 parts per million when the metal is cobalt, (b) 2 to 25 parts per million when the metal is selected from the group consisting of cerium, copper and manganese, and (c) 10 to 100 parts per million when the metal is selected from the group consisting of magnesium, potassium, calcium, vanadium, chromium, iron, nickel, zinc, zirconium, molybdenum, antimony, tungsten and lead.

2. The improved process of preparing thermosetting allylic resin molding compounds of claim 1 in which the allylic prepolymer is a diallyl phthalate prepolymer selected from the group consisting of diallyl orthophthalate and diallyl isophthalate prepolymers.

3. The improved process of preparing thermosetting allylic molding compounds of claim 1 in which the compounding is done on a two-roll differential speed mill.

4. The improved process of preparing thermosetting allylic molding compounds of claim 1 in which the metal in chemically combined form is added to the allylic prepolymer prior to compounding.

5. A thermosetting allylic prepolymer containing less than 100 parts per million, by weight, of a metal or mixture of metals, in chemically combined form, selected from the group consisting of magnesium, potassium, calcium, vanadium, chromium, manganese, iron, cobalt, nickel, copper, zinc, zirconium, molybdenum, antimony, tungsten, lead and cerium; the metal being present in the amount of (a) 1 to 15 parts per million when the metal is cobalt, (b) 2 to 25 parts per million when the metal is selected from the group consisting of cerium, copper and manganese, and (c) 10 to 100 parts per million when the metal is selected from the group consisting of magnesium, potassium, calcium, vanadium, chromium, iron, nickel, zinc, zirconium, molybdenum, antimony, tungsten, lead and lead.

6. The thermosetting allylic prepolymer of claim 5 in which the prepolymer is selected from the group consisting of diallyl orthophthalate and diallyl isophthalate prepolymer.

7. A thermosetting allylic resin molding compound, with adjusted bulk viscosity and flow characteristics, comprising a (compounded) mixture of allylic prepolymer, fillers, reinforcing fibers, mold lubricants, an effective amount of less than 100 parts per million based on the prepolymer, of a metal or mixture of metals in chemically combined form, selected from the group consisting of magnesium, potassium, calcium, vanadium, chromium, manganese, iron, cobalt, nickel, copper, zinc, zirconium, molybdenum, antimony, tungsten, lead and cerium, and an effective amount of a catalyst which is not substantially promoted by the metal; the metal being present in the amount of (a) 1 to 15 parts per million when the metal is cobalt, (b) 2 to 25 parts per million when the metal is selected from the group consisting of cerium, copper and manganese, and (c) 10 to 100 parts per million when the metal is selected from the group consisting of magnesium, potassium, calcium, vanadium, chromium, iron, nickel, zinc, zirconium, molybdenum, antimony, tungsten and lead.

8. The thermosetting allylic molding compound of claim 7 in which the allylic prepolymer is selected from the group consisting of diallyl orthophthalate and diallyl isophthalate prepolymers.

References Cited

UNITED STATES PATENTS

| | | | |
|---|---|---|---|
| 2,990,388 | 6/1961 | Johnston | 260—23 |
| 3,216,958 | 11/1965 | Sheld | 260—23.5 |
| 3,355,404 | 11/1967 | Ruffing | 260—23 |

OTHER REFERENCES

Chem. Abst.; 53; 15, 624(i), 1959.

JOSEPH L. SCHOFER, Primary Examiner

C. A. HENDERSON, Jr., Assistant Examiner

U.S. Cl. X.R.

260—23, 23.5, 41, 80; 264—300

UNITED STATES PATENT OFFICE
CERTIFICATE OF CORRECTION

Patent No. 3,579,484          Dated March 18, 1972

Inventor(s) James Larue Thomas

It is certified that error appears in the above-identified patent and that said Letters Patent are hereby corrected as shown below:

Table I, line 1, "<30" should read -->30--.

Column 9, line 74, "3,385,836, issued May 28, 1968, filed September 8, 1965," should read -- 3,398,125, issued August 20, 1968,--.

Column 10, Table, line 34, "Cooctate" should read -- Co Octoate--.

Signed and sealed this 2nd day of January 1973.

(SEAL)
Attest:

EDWARD M. FLETCHER, JR.
Attesting Officer

ROBERT GOTTSCHALK
Commissioner of Patents